(12) United States Patent
Oh

(10) Patent No.: US 11,943,424 B2
(45) Date of Patent: Mar. 26, 2024

(54) IMAGING SYSTEM CONFIGURED TO USE TIME-OF-FLIGHT IMAGING AND STEREO IMAGING

(71) Applicant: MICROSOFT TECHNOLOGY LICENSING, LLC, Redmond, WA (US)

(72) Inventor: Minseok Oh, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/728,124

(22) Filed: Apr. 25, 2022

(65) Prior Publication Data
US 2022/0247995 A1 Aug. 4, 2022

Related U.S. Application Data

(62) Division of application No. 16/691,372, filed on Nov. 21, 2019, now Pat. No. 11,330,246.

(51) Int. Cl.
| | |
|---|---|
| H04N 13/254 | (2018.01) |
| G01C 3/14 | (2006.01) |
| G01S 17/86 | (2020.01) |
| G01S 17/894 | (2020.01) |
| G06T 7/593 | (2017.01) |
| H04N 13/239 | (2018.01) |
| H04N 13/296 | (2018.01) |
| H04N 13/00 | (2018.01) |

(52) U.S. Cl.
CPC ............. *H04N 13/254* (2018.05); *G01C 3/14* (2013.01); *G01S 17/86* (2020.01); *G01S 17/894* (2020.01); *G06T 7/593* (2017.01); *H04N 13/239* (2018.05); *H04N 13/296* (2018.05); *G06T 2207/10012* (2013.01); *H04N 2013/0081* (2013.01)

(58) Field of Classification Search
CPC .. H04N 13/254; H04N 13/239; H04N 13/296; H04N 2013/0081; G01S 17/86; G01S 17/894; G01C 3/14; G06T 7/593; G06T 2207/10012
See application file for complete search history.

(56) References Cited

U.S. PATENT DOCUMENTS

| | | | |
|---|---|---|---|
| 10,410,368 B1 * | 9/2019 | Galor Gluskin | H04N 25/704 |
| 2018/0158204 A1 * | 6/2018 | Yu | H04N 13/271 |

(Continued)

*Primary Examiner* — Richard T Torrente
(74) *Attorney, Agent, or Firm* — Newport IP, LLC; Jacob P. Rohwer

(57) ABSTRACT

An imaging system is configured to use an array of time-of-flight (ToF) pixels to determine depth information using the ToF imaging method and/or the stereo imaging method. A light emitting component emits light to illuminate a scene and a light detecting component detects reflected light via the array of ToF pixels. A ToF pixel is configured to determine phase shift data based on a phase shift between the emitted light and the reflected light, as well as intensity data based on an amplitude of the reflected light. Multiple ToF pixels are shared by a single micro-lens. This enables multiple offset images to be generated using the intensity data measured by each ToF pixel. Accordingly, via a configuration in which multiple ToF pixels share a single micro-lens, depth information can be determined using both the ToF imaging method and the stereo imaging method.

20 Claims, 9 Drawing Sheets

(56) References Cited

U.S. PATENT DOCUMENTS

2019/0033448 A1* 1/2019 Molnar .................. G01S 17/46
2019/0346570 A1* 11/2019 Ortiz Egea ........... G01S 7/4866
2020/0057151 A1* 2/2020 Finkelstein ........... G01S 7/4815

* cited by examiner

IMAGING SYSTEM CONFIGURED TO USE TIME-OF-FLIGHT IMAGING AND STEREO IMAGING

CROSS-REFERENCE TO RELATED APPLICATION

This application is a divisional of U.S. patent application Ser. No. 16/691,372, filed Nov. 21, 2019, the content of which application is hereby expressly incorporated herein by reference in its entirety.

BACKGROUND

A depth camera can use any one of various types of pixels to determine the depth of an object in a scene. For instance, a depth camera can include an array of stereo pixels and can implement a passive imaging approach configured to determine depth information from disparity data. This passive imaging approach may be referred to as the "stereo" imaging method which creates an illusion of depth in an image by means of stereopsis for binocular vision. More specifically, a stereo pixel typically includes a pair of adjacent photo-sensing diodes covered by a single micro-lens. An array of stereo pixels can generate two offset images (e.g., a left and a right image) using incident light separately detected by individual pairs of the adjacent photo-sensing diodes. The disparity data includes the distance between two corresponding points in the two offset images. The stereo imaging method uses a known distance between a pair of photo-sensing diodes to obtain the disparity data for the two offset images and then use the disparity data to determine depth information. An advantage of the stereo imaging method is that an artificial light source is not needed. FIG. 1A illustrates a stereo pixel 102 with a pair of photo-sensing diodes 104, 106 that share a single micro-lens 108.

Alternatively, a depth camera can include an array of time-of-flight pixels and can implement an active imaging approach that determines depth information using phase shift data. This active imaging approach may be referred to as the "time-of-flight" imaging method. A time-of-flight pixel typically includes one photo-sensing diode, and two photo gates or two transfer gates. More specifically, the time-of-flight imaging method illuminates a scene with light emitted from an artificial light source and detects light that is reflected. The phase shift between the emitted light and the reflected light is measured and depth information can be determined based on the phase shift. FIG. 1B illustrates a time-of-flight (ToF) pixel 110 with a single photo-sensing diode 112 behind a single micro-lens 114.

Unfortunately, both the stereo imaging method and the time-of-flight imaging method may experience issues with respect to accurately determining depth information for a scene. The stereo imaging method struggles to accurately determine depth information when the scene does not include recognizable patterns that enable effective correspondence between a point in a first of the two offset images and the same point in the second of the two offset images. The time-of-flight imaging method struggles to accurately determine depth information when there is strong ambient light (e.g., sun light) that interferes with the reflected light.

It is with respect to these considerations and others that the disclosure made herein is presented.

SUMMARY

The techniques disclosed herein describe an imaging system configured to use an array of time-of-flight pixels and a corresponding controller to determine depth information for a scene based on the time-of-flight imaging method and/or the stereo imaging method. That is, the techniques described herein allow for the time-of-flight imaging method and the stereo imaging method to be used in a complementary way to improve accuracy with respect to determining depth information for a scene.

As described above, the stereo imaging method needs recognizable patterns in a scene to effectively determine corresponding points in two offset images. If the patterns cannot be recognized, then the stereo imaging method is typically ineffective with respect to accurately determining depth. The time-of-flight imaging method does not need to recognize such patterns to accurately determine depth. Instead, the accuracy in determining depth information for the time-of-flight imaging method is affected when strong ambient light interferes with reflected light. However, ambient light helps expose patterns that, when recognized, enable effective correspondence between points in the two offset images. Therefore, ambient light is good for the stereo imaging method.

The array of time-of-flight pixels and the corresponding controller described herein account for the deficiencies in both the time-of-flight imaging method and the stereo imaging method. Consequently, the techniques described herein improve the accuracy with respect to determining depth information because the techniques can accommodate varying conditions that affect the determination of depth. These conditions can include a varying degree of recognizable patterns in a scene, varying amounts of ambient light, and/or other conditions that may vary from one scene to the next.

The imaging system described herein may include a depth camera configured with an integrated circuit. The imaging system includes a light emitting component configured to emit light to illuminate a scene and a light detecting component to detect reflected light. The light detecting component includes an array of time-of-flight pixels. A time-of-flight pixel is configured to determine phase shift data based on a phase shift between the emitted light and the reflected light. The array of time-of-flight pixels can be used to determine depth information via the time-of-flight imaging method using the phase shift data measured by the time-of-flight pixels. Furthermore, a time-of-flight pixel is configured to determine intensity data using the amplitude of the reflected light.

The light detecting component further includes a plurality of micro-lenses. Each micro-lens is shared by at least two time-of-flight pixels. This enables multiple time-of-flight pixels to have an overlapping field-of-view so that at least two offset images can be generated using the intensity data measured by each time-of-flight pixel. Disparity data can be determined based on intensity values that correspond to the same point in the offset images. Accordingly, via the configuration in which at least two time-of-flight pixels share a single micro-lens, the array of time-of-flight pixels can also be used to determine depth information via the stereo imaging method using the intensity data measured by the time-of-flight pixels.

The imaging system further includes a controller. The controller is configured to generate a first depth image of a scene using the time-of-flight imaging method. That is, the controller can use the phase shift data determined for each time-of-flight pixel in the array to generate the first depth image. The controller is further configured to determine disparity data based on the intensity data measured by each of the at least two time-of-flight pixels shared by an individual micro-lens. The controller can generate a second depth image of the scene using the disparity data determined for each micro-lens.

Accordingly, the imaging system is configured to generate depth data using both of the time-of-flight imaging method and the stereo imaging method. The controller can use one or both of the first depth image generated via the time-of-flight imaging method or the second depth image generated via the stereo imaging method to determine a distance between an object in a scene and the imaging system. In one example, the controller can combine the depth data in the first depth image with the depth data in the second depth image, by averaging corresponding depth values for an individual pixel, to generate a representative depth image. The controller can then use the representative depth image to determine the distance between the object in the scene and the imaging system.

In another example, the controller can compare a first depth quality of the first depth image with a second depth quality of the second depth image. To determine the quality, the controller can segment a depth image and perform a segmentation analysis in which edge sharpness and/or uniformity between segments is evaluated for the depth images. The controller can determine that one of the depth images is of higher quality and select such a depth image as the one to be used to determine the distance between the object in the scene and the imaging system.

In addition to those technical benefits discussed above, implementations of the disclosed techniques can result in improved focusing for a camera. For instance, the determined distance between an object in the scene and the imaging system can be used to focus a camera on the object and/or to select (e.g., activate) a pre-configured mode for a camera to capture a photograph of the object in the scene. Alternatively, implementations of the disclosed techniques can result in improved motion recognition (e.g., location and movement of a human body in a physical space) which can be used for input to an application executing on a computing system such as a gaming console. Other technical benefits not specifically mentioned herein can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The Detailed Description discloses aspects of an imaging system configured to use an array of time-of-flight pixels and a corresponding controller to determine depth information for a scene based on the time-of-flight imaging method and/or the stereo imaging method. The imaging system includes a light emitting component configured to emit light to illuminate a scene and a light detecting component to detect reflected light. The light detecting component includes an array of time-of-flight pixels. A time-of-flight pixel is configured to determine phase shift data based on a phase shift between the emitted light and the reflected light. Accordingly, the array of time-of-flight pixels can be used to determine depth information via the time-of-flight imaging method using the phase shift data measured by the time-of-flight pixels. Furthermore, a time-of-flight pixel is configured to determine intensity data using an amplitude of the reflected light.

The light detecting component further includes a plurality of micro-lenses. Each micro-lens is shared by at least two time-of-flight pixels. This enables multiple time-of-flight pixels to have an overlapping field-of-view so that two offset images can be generated using the intensity data measured by each time-of-flight pixel. Accordingly, via the configuration in which at least two time-of-flight pixels share a single micro-lens, the array of time-of-flight pixels can also be used to determine depth information via the stereo imaging method using the intensity data measured by the time-of-flight pixels.

Figure 1A:
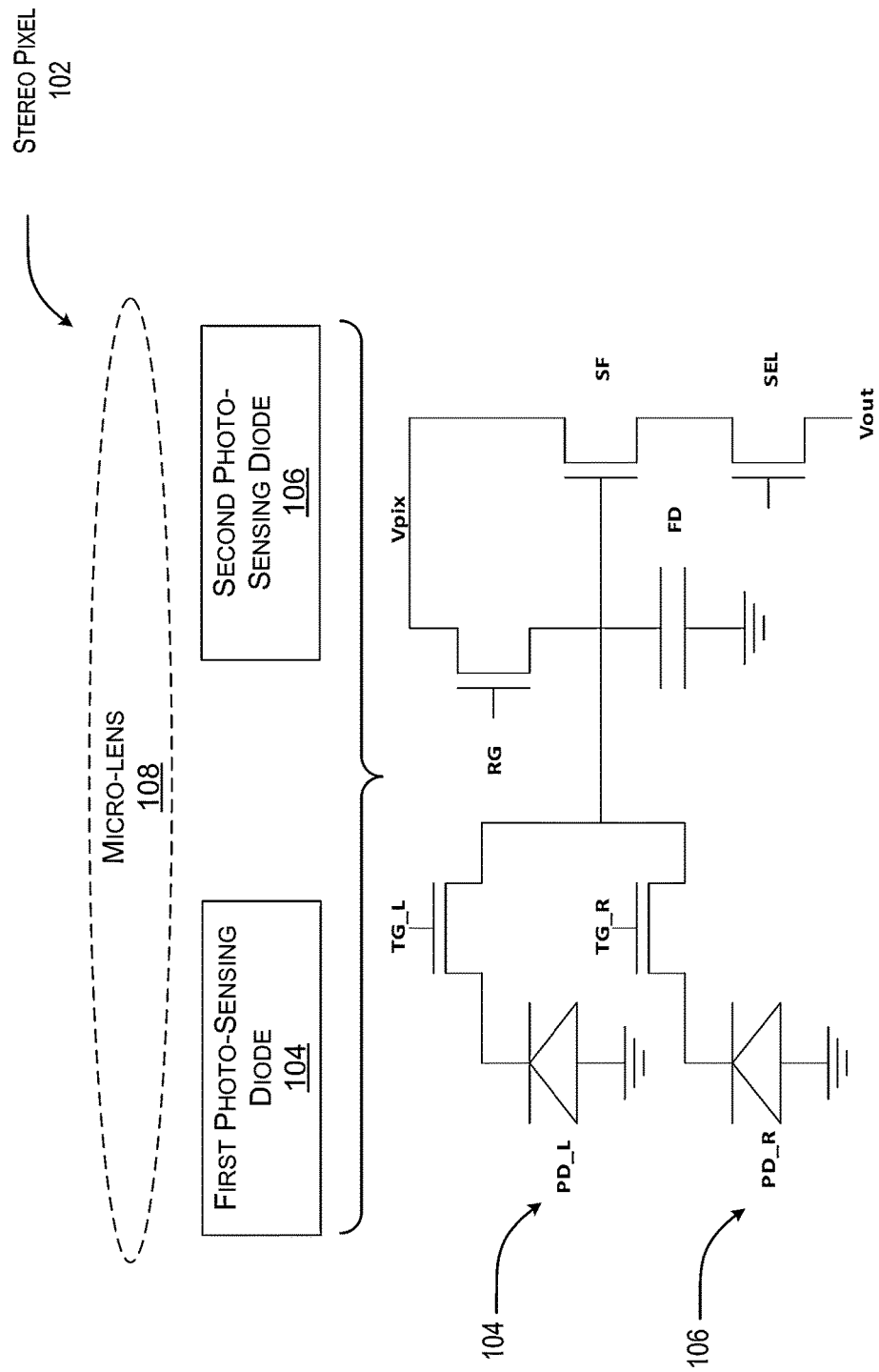
FIG. 1A illustrates a conventional stereo pixel.
Figure 1B:
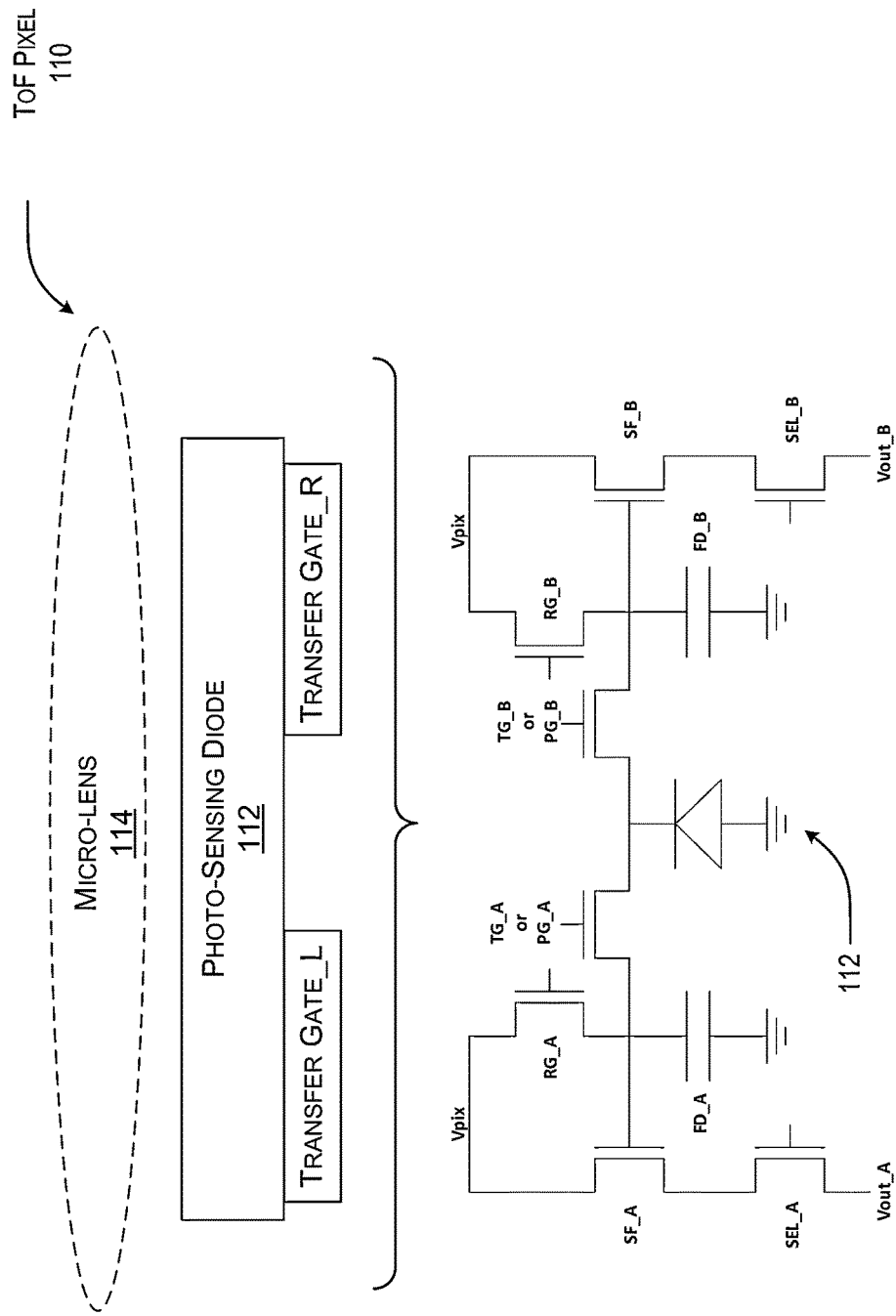
FIG. 1B illustrates a conventional time-of-flight pixel.
Figure 2:
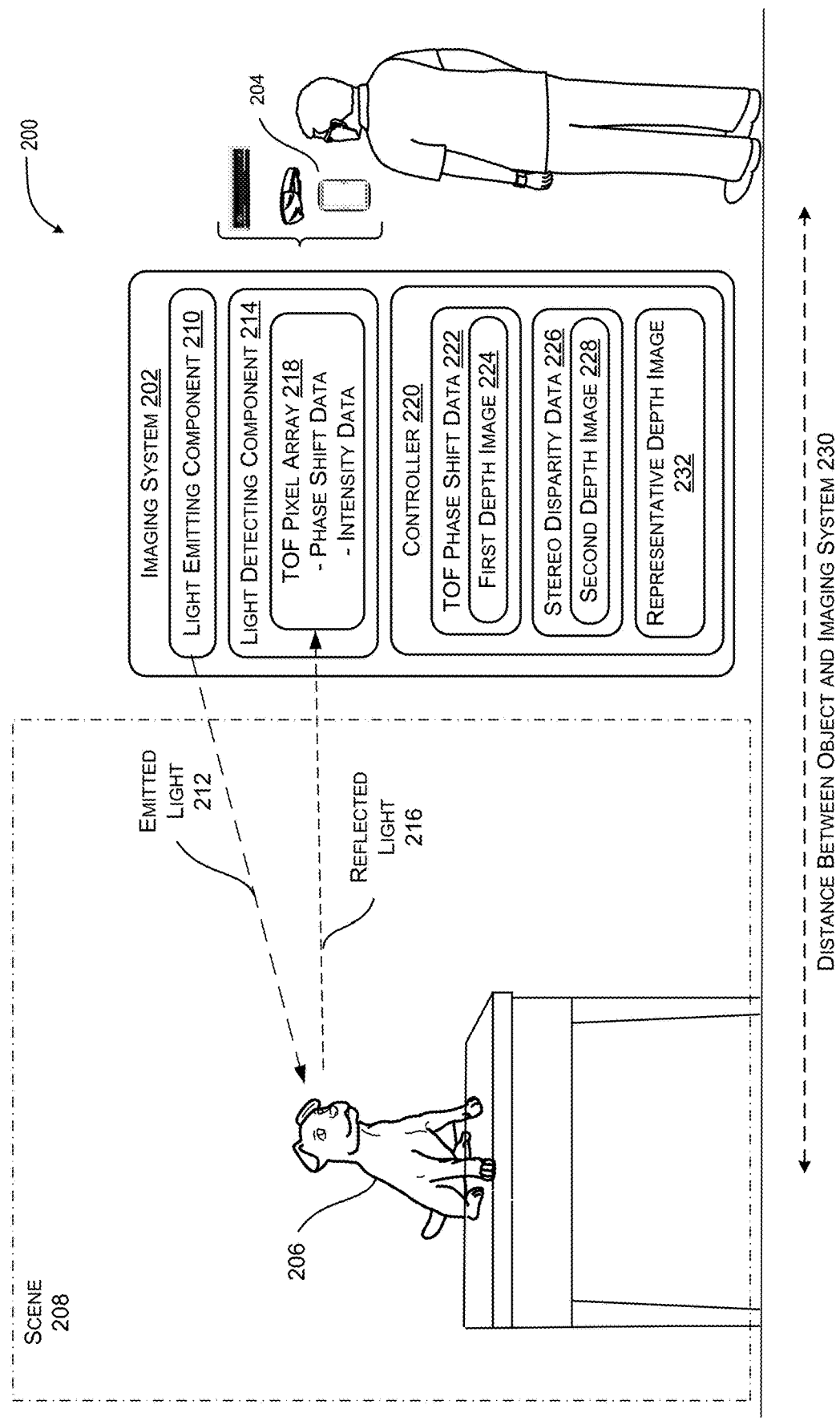
FIG. 2 illustrates an example environment in which the imaging system described herein can be used.

FIG. 2 illustrates an example environment 200 in which the imaging system 202 described herein can effectively be used. The imaging system 202 can comprise a depth camera that can be part of, or connected to, a device 204. The device 204 may be configured to use the depth of an object 206 (e.g., a dog in this example) in a scene 208 for various purposes. For instance, the depth of the object 206 may be used to focus a camera for a photograph. Alternatively, the depth of the object 206 may be used to better detect motion of a user that is interacting with a game console while playing a game. Additionally, the depth of the object 206 may be used to present associated virtual content via a head-mounted display device. Thus, the device 204 may include a smart phone, a head-mounted display device, a game console, a tablet device, a laptop device, a camera, etc.

The scene 208 can comprise the physical space that is in front of the device 204 or the physical space that surrounds the device 204.

As shown in the example environment 200, the imaging system 202 includes a light emitting component 210 configured to emit light 212 to illuminate the scene 208 and/or the object 206. The imaging system 202 further includes a light detecting component 214 to detect light 216 that is reflected off the object 206. The light detecting component 214 includes an array 218 of time-of-flight pixels. The techniques described herein can be used with various types of indirect time-of-flight pixels including photogate time-of-flight pixels, transfer gate time-of-flight pixels, current-assisted time-of-flight pixels, and so forth.

A time-of-flight pixel is configured to determine phase shift data based on a phase shift between the emitted light 214 and the reflected light 216. For example, the light emitting component 210 can illuminate the scene 208 using a modulated light source that produces a pulse or a continuous wave (e.g., a sinusoid or a square wave). The modulated light source can be a solid-state laser or a light-emitting diode operating in the near-infrared range (e.g., ~850 nm), which is invisible to human eyes. The light detecting component 214 can observe the reflection. The phase shift between the illumination and the reflection is measured and translated into distance.

In an example in which the light emitting component 210 illuminates the scene 208 with a continuous wave, the light detecting component 214 illuminates the scene for a period of time and can measure the reflected energy using ninety degree phase-stepped samples. Electrical charges accumulated during these samples ($Q_1$, $Q_2$, $Q_3$, $Q_4$) can be measured. The phase angle between illumination and reflection ($\varphi$) and the distance (d) can be calculated as follows:

$$\varphi = \arctan\left(\frac{Q_3 - Q_4}{Q_1 - Q_2}\right)$$

$$d = \frac{c}{4\pi f}\varphi$$

In the equation above, c is a speed-of-light constant. To further this example, a time-of-flight pixel is configured to determine intensity data A based on the following calculation:

$$A = \frac{\sqrt{(Q_1 - Q_2)^2 + (Q_3 - Q_4)^2}}{2}$$

Figure 3:
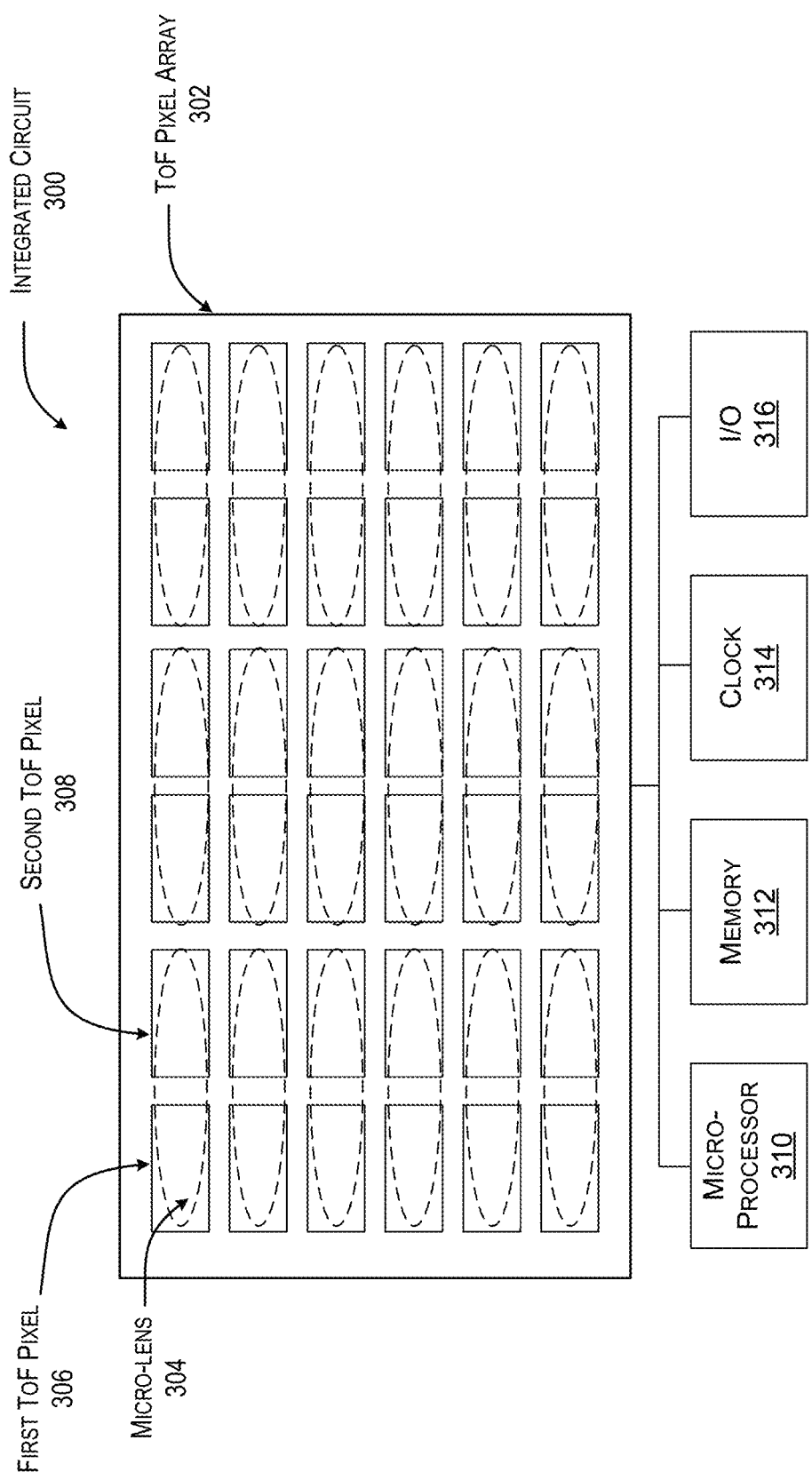
FIG. 3 illustrates an example of a depth camera implemented via an integrated circuit.

As further described herein with respect to FIG. 3, the light detecting component 214 further includes a plurality of micro-lenses. Each micro-lens is shared by at least two time-of-flight pixels. In other words, multiple time-of-flight pixels that share a single micro-lens have an overlapping field-of-view so that offset images can be generated using the intensity data determined by each time-of-flight pixel.

The imaging system 202 also includes a controller 220. The controller 220 is configured to use the phase shift data 222 from the time-of-flight pixel array 218 to generate a first depth image 224 (e.g., a depth map with depth values for each pixel) of the scene 208. Consequently, the controller 220 can generate the first depth image 224 using the time-of-flight imaging method, or the depth values determined based on the phase shift data 222.

The controller 220 is also configured to use the intensity data from the time-of-flight pixel array 218 to determine disparity data 226 (e.g., a measurable distance between two corresponding points in a pair of offset images). The intensity data, aggregated across the plurality of micro-lenses, can be used to generate offset images of the scene 208 and to determine the disparity data 226 between corresponding points. The disparity data 226 is used to generate a second depth image 228. Consequently, the controller 220 can generate the second depth image 228 using the stereo imaging method, which as described above, is different than the time-of-flight imaging method.

Using the techniques described above, the imaging system 202 can accommodate varying scene conditions because the imaging system 202 is configured to generate depth data using both the time-of-flight imaging method and the stereo imaging method. The controller 220 can leverage one or both of the first depth image 224 or the second depth image 228 to determine a distance 230 between an object 206 in the scene 208 and the imaging system 202. For instance, the first depth image 224 generated using the time-of-flight method is more likely to include accurate depth information if there is limited ambient light. In contrast, the second depth image 228 generated using the stereo method is more likely to include accurate depth information if there is strong ambient light.

In one example, the controller 220 can combine the depth data in the first depth image 224 with the depth data in the second depth image 226, by averaging depth values for an individual pixel, to generate a representative depth image 232. The controller 220 can then use the representative depth image 232 to determine the distance 230 between the object 206 and the imaging system 202.

In another example, the controller 220 can compare a first depth quality of the first depth image 224 with a second depth quality of the second depth image 228. To determine the quality, the controller 220 can segment the depth images 224, 228 and perform a segmentation analysis in which edge sharpness and/or uniformity between segments is evaluated. The controller 220 can determine that one of the depth images 224, 228 is of higher quality, with respect to the segment(s) that contain the object 206, and select such a depth image 224, 228 as the one to be used to accurately determine the distance 230 between the object 206 in the scene 208 and the imaging system 202. Other ways of determining quality may also be used.

The depth camera can include an integrated circuit. FIG. 3 illustrates an example of a depth camera implemented via an integrated circuit (IC) 300. The depth camera includes a two-dimensional array 302 of time-of-flight pixels (e.g., the time-of-flight pixel array 218 in FIG. 2). An individual time-of-flight pixel includes dedicated circuitry for processing a detection charge output. In a specific example, the time-of-flight pixel array 302 may include one hundred by one hundred pixels, and thus, the time-of-flight pixel array 302 may include one hundred by one hundred processing circuits.

In order for the depth camera to implement the stereo imaging method in addition to the time-of-flight imaging method, a single micro-lens 304 is shared by (e.g., covers) multiple time-of-flight pixels. As shown in the example of FIG. 3, a single micro-lens 304 is shared by two time-of-flight pixels 306, 308 and this approach is propagated throughout the time-of-flight pixel array 302. The integrated circuit 300 also includes a controller 310 such as a microprocessor (e.g., the controller 220 in FIG. 2) which is configured to receive data from the processing circuits of the time-of-flight pixels, a memory 312 (e.g., random access memory and/or read-only memory) configured to store the data for the time-of-flight pixel array 302, a clock 314, and/or input/output (I/O) circuitry 316.

The controller 310 is configured to cause the light emitting component (e.g., a laser diode or LED device) to emit light, via a lens, into a scene 208 and/or towards a target object 206, such as the dog in FIG. 2. As described above, some of the emitted light will be reflected off the object 206 and fall upon the time-of-flight pixel array 302. Each time-of-flight pixel is configured to measure both the amplitude of the reflected light (e.g., the intensity) and the phase shift of the light as the light travels from the light emitting component to the object 206 and then back to the time-of-flight pixel array 302.

Figure 4:
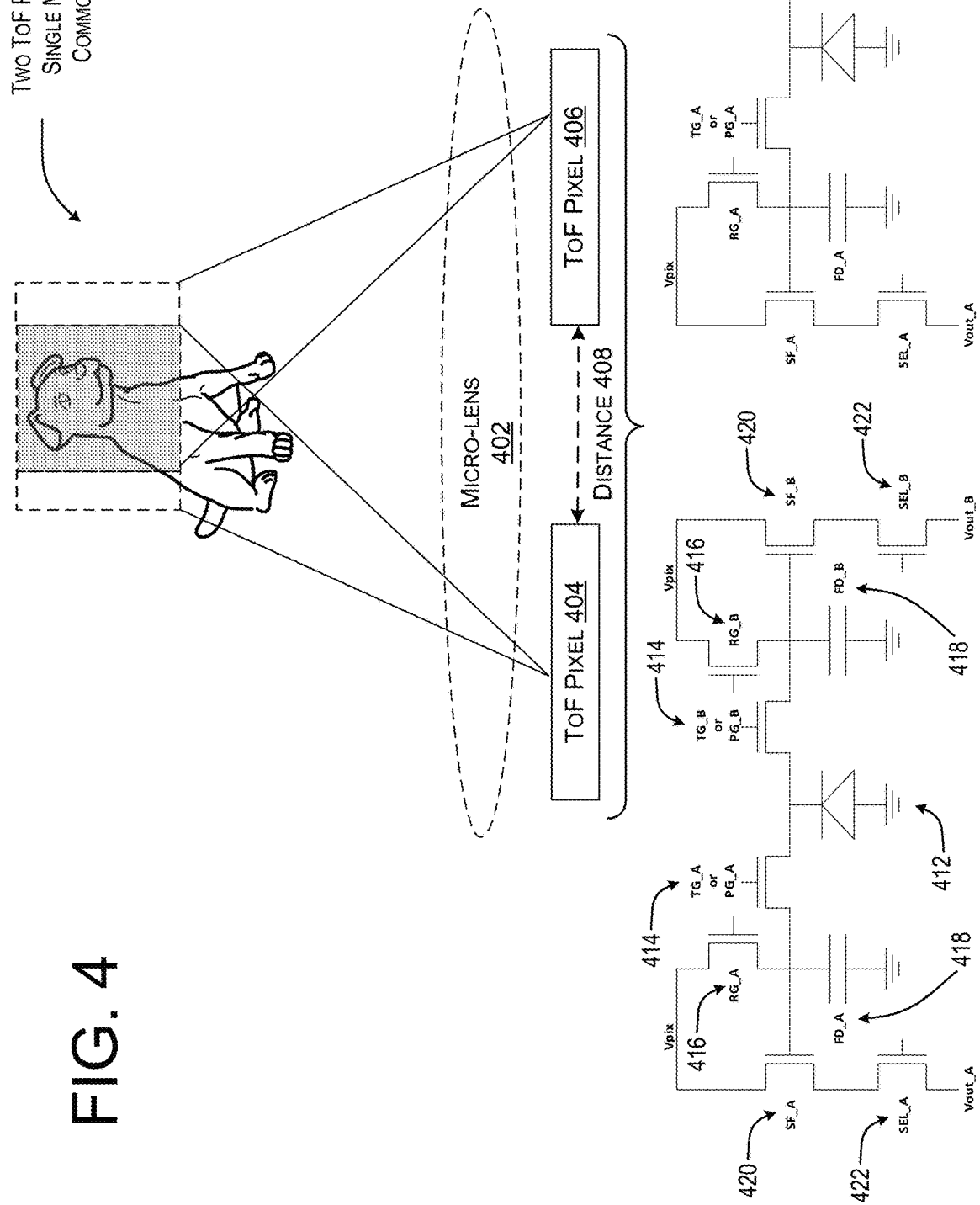
FIG. 4 illustrates an example of how two time-of-flight pixels have a common field-of-view of an object when they share a micro-lens, and thus, the configuration can be used to implement the stereo imaging method in addition to the time-of-flight imaging method.

FIG. 4 illustrates an example 400 of how two time-of-flight pixels have a common field-of-view of an object when they share a micro-lens. As shown, a single micro-lens 402 covers a first time-of-flight pixel 404 and a second time-of-flight pixel 406 separated by a distance 408. The single micro-lens 402 enables the first time-of-flight pixel 404 and the second time-of-flight pixel 406 to share a field of view (e.g., the shaded area covering the dog), and thus, two offset images (e.g., a left image and a right image) can be generated based on intensity data measured by the time-of-flight pixels. Then disparity data can be determined between the two offset images, for example, based on the measured shift between the left and the right images and the distance 408.

FIG. 4 also illustrates the make up of an example time-of-flight pixel. As shown, a time-of-flight pixel diagram on the left of FIG. 4 can include a photo diode 412, transfer gate transistors or photo gate transistors 414, reset transistors 416, floating diffusion regions 418, amplifier transistors 420, and/or selection transistors 422.

Figure 5:
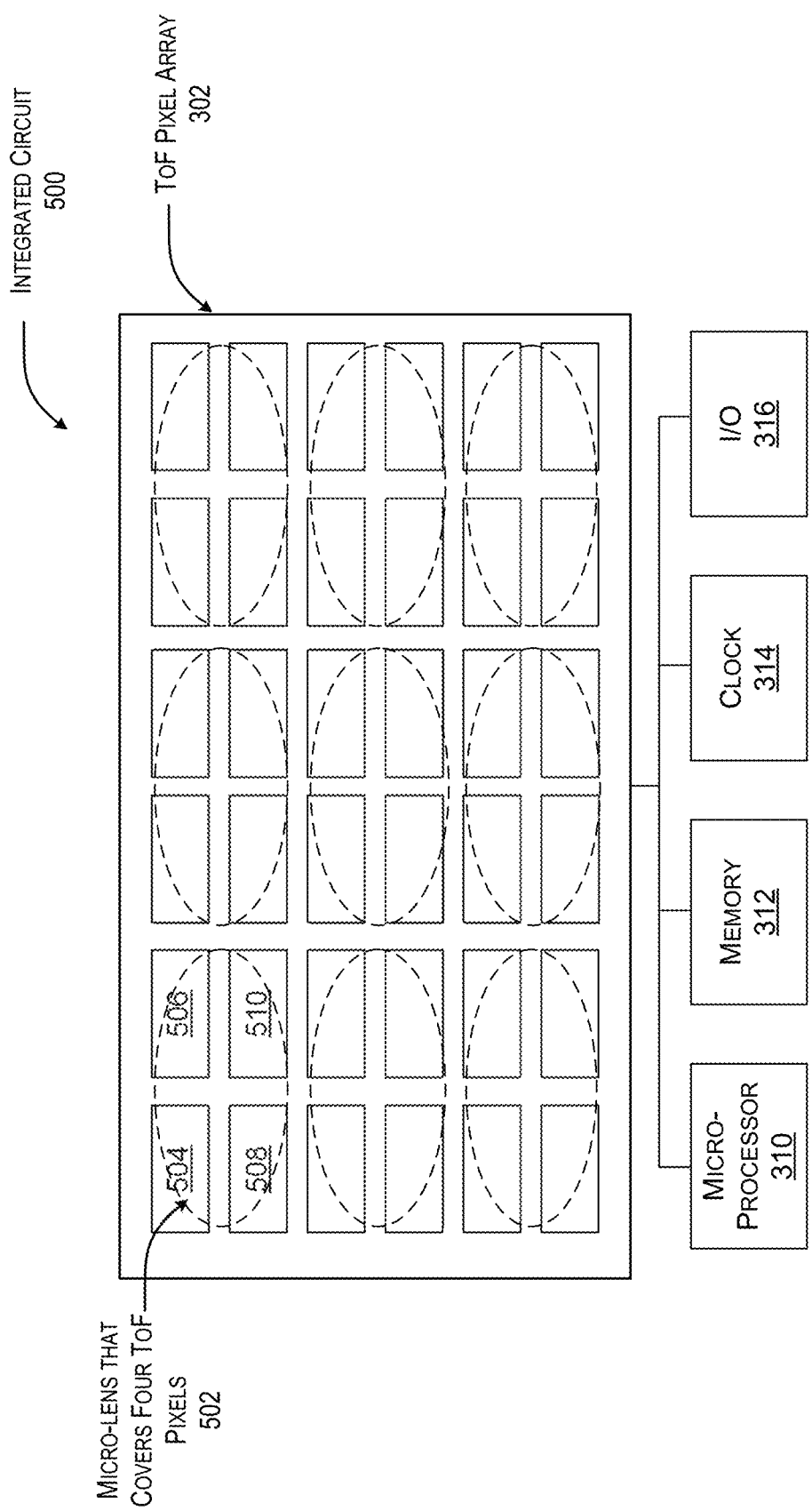
FIG. 5 illustrates another example of a depth camera implemented on an integrated circuit.

FIG. 5 illustrates another example of a depth camera implemented on an integrated circuit (IC) 500. The integrated circuit 500 is similar to the one illustrated in FIG. 3. However, in the two-dimensional array 302 of time-of-flight pixels, a single micro-lens 502 shares four time-of-flight pixels 504, 506, 508, 510. In this example, the microprocessor 310 can be configured to use disparity data based on four offset images to generate a depth image using the stereo imaging method.

Figure 6:
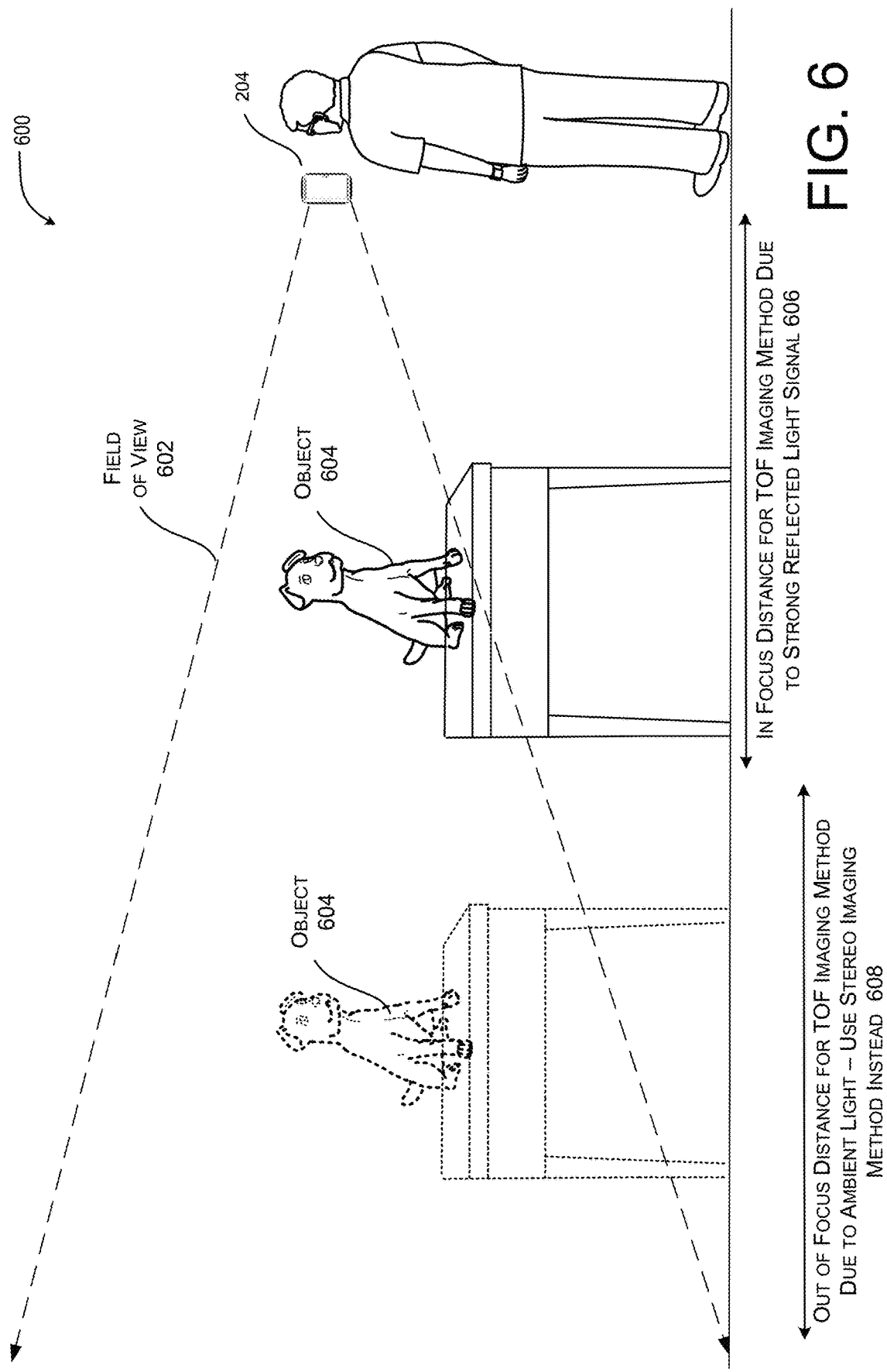
FIG. 6 illustrates an example environment in which the imaging system can use the time-of-flight imaging method and the stereo imaging method in a complementary manner.

FIG. 6 illustrates an example environment 600 in which the imaging system can use the time-of-flight imaging method and the stereo imaging method in a complementary manner. As described with respect to FIG. 2, the imaging system 202 may be part of a device 204 configured with a camera. The camera can be configured to capture a field-of-view 602 for a photograph. When the object 604 being photographed is located within a particular distance 606 of the imaging system, the time-of-flight imaging method may be used to focus the camera on the object 604 because the object 604 is close enough to provide a strong reflected light signal. The strong reflected light signal is less likely to be interfered with due to conditions in which ambient light is present.

However, when the object 604 being photographed is located outside this particular distance 606 from the imaging system (as captured by the dashed line version of the object 604 and the out of focus distance 608), the stereo imaging method may be used to focus the camera on the object 604 because the reflected light signal is weakened as a result of the larger distance and the ambient light.

Figure 7:
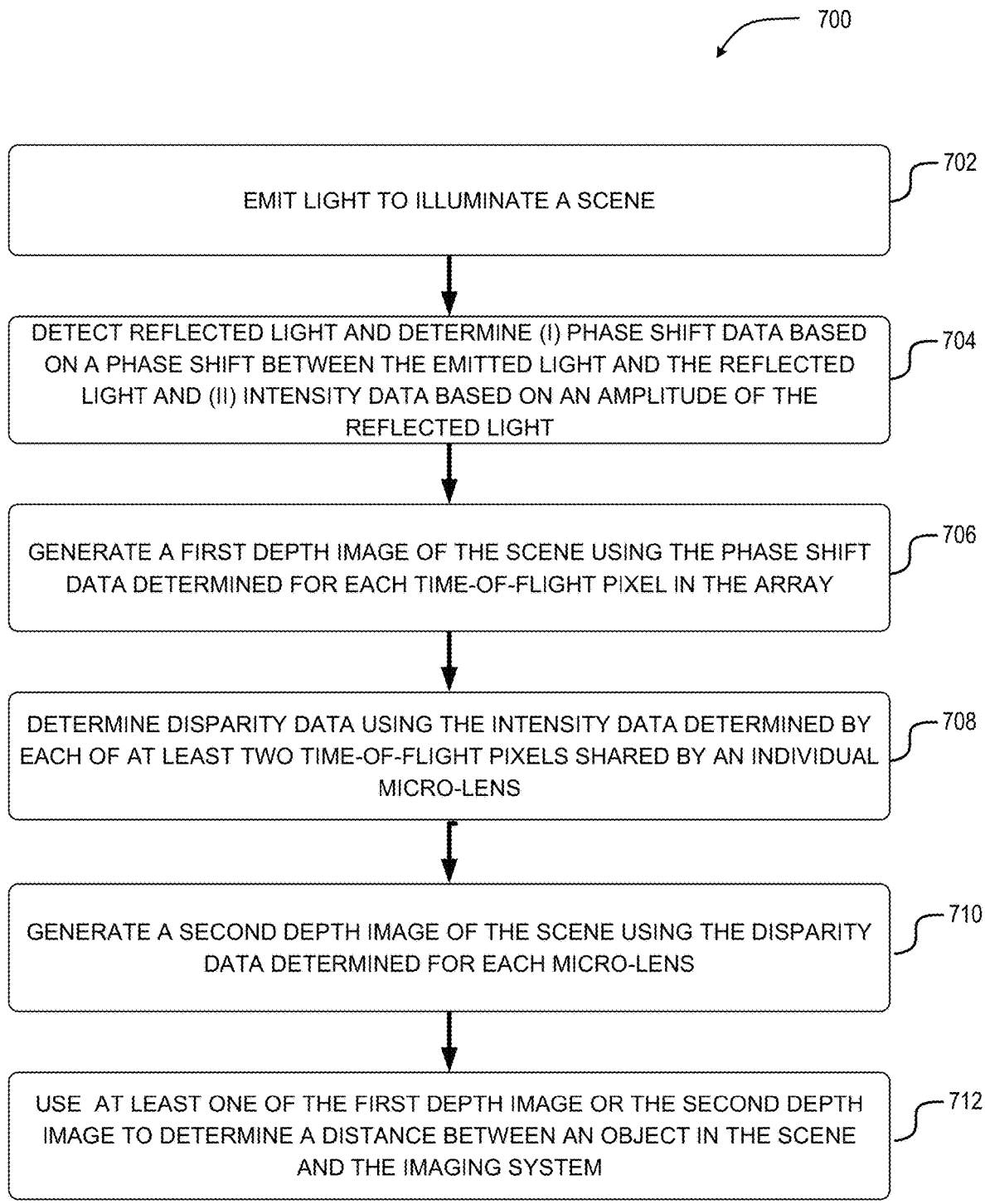
FIG. 7 is a flow diagram showing aspects of a routine for using one or both of the stereo imaging method and the time-of-flight imaging method to determine the depth of an object in a scene.

FIG. 7 is a flow diagram illustrating routine 700 describing aspects of the present disclosure. In various examples, operations of the routine 700 can be performed by the imaging system 202. The logical operations described herein with regards to any one of FIG. 7 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routine 700 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routine 700 may be also implemented in many other ways. For example, the routine 700 may be implemented, at least in part, by another remote computer, processor, or circuit. In addition, one or more of the operations of the routine 700 may alternatively or additionally be implemented, at least in part, by a chipset working alone or in conjunction with other software modules. In the examples described below, one or more modules of a computing system can receive and/or process the data disclosed herein.

Any service, circuit, or application suitable for providing the techniques disclosed herein can be used in the operations described.

With reference to FIG. 7, the routine 700 begins at operation 702 where light is emitted to illuminate a scene. At operation 704, reflected light is detected by an array of time-of-flight pixels and an individual time-of-flight pixel in the array determines (i) phase shift data based on a phase shift between the emitted light and the reflected light and (ii) intensity data based on an amplitude of the reflected light. As described above, the array of time-of-flight pixels includes a plurality of micro-lenses and each micro-lens is shared by at least two time-of-flight pixels so that the stereo imaging method can be used as a complementary approach to the time-of-flight imaging method. At operation 706, a first depth image of a scene is generated using the phase shift data determined for each time-of-flight pixel in the array.

At operation 708, disparity data is determined using the intensity data determined by each of at least two time of flight pixels that share a micro-lens. At operation 710, a second depth image is generated using the disparity data determined for each micro-lens.

At operation 712, at least one of the first depth image or the second depth image is used to determine a distance between an object in the scene and an imaging system that includes the array of time-of-flight pixels. For example, the distance can be used to focus a camera on the object and/or to select (e.g., activate) a pre-configured mode for a camera to capture a photograph of the object. In another example, the distance can be used to improve motion recognition (e.g., location and movement of a human body in a physical space) which can be used for input to an application executing on a computing system such as a gaming console. In yet another example, the distance may be used to display virtual content associated with an object via a head-mounted display device.

Figure 8:
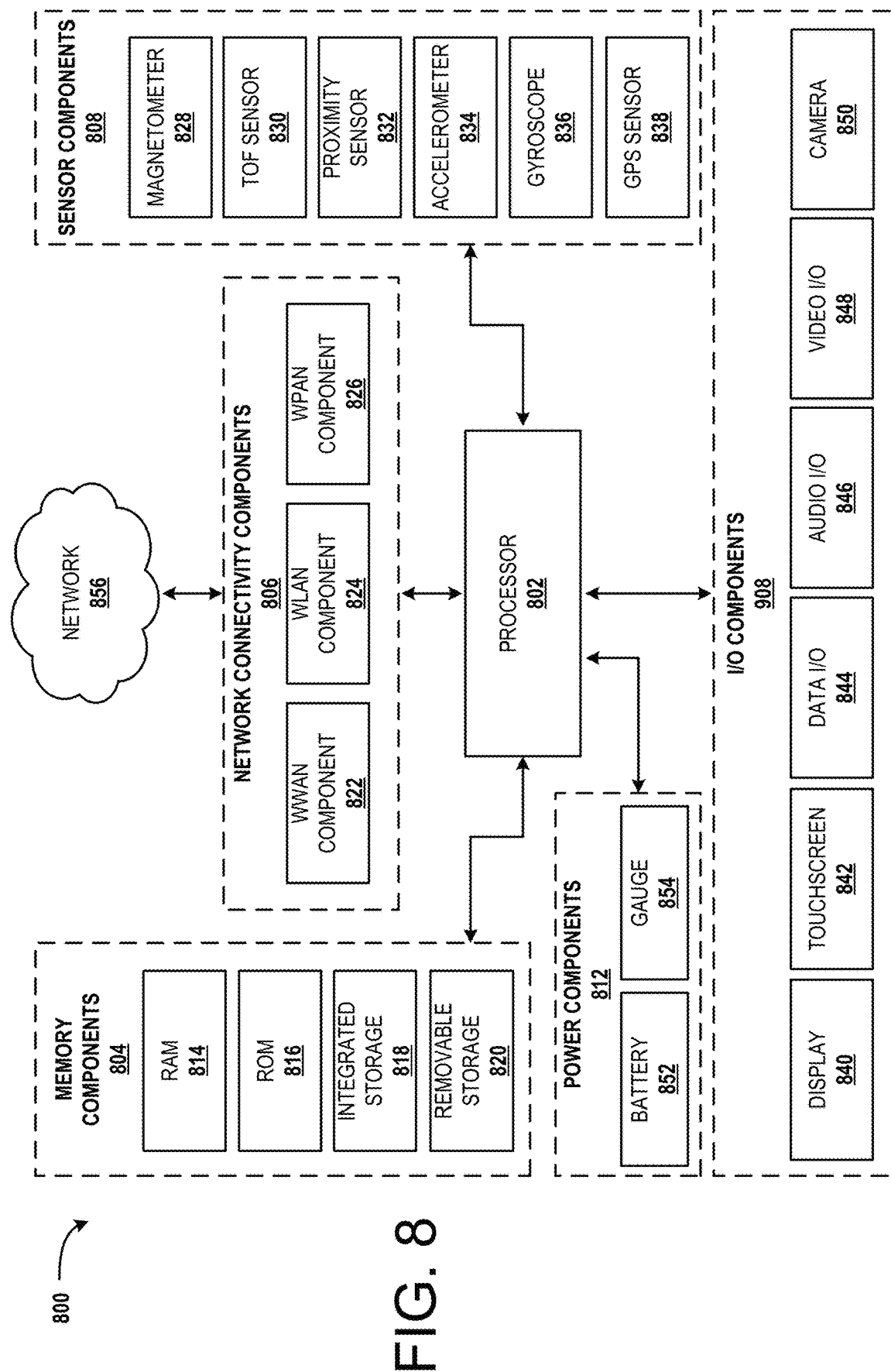
FIG. 8 is a computing architecture diagram showing aspects of the configuration and operation of a device that can implement aspects of the techniques disclosed herein.

FIG. 8 illustrates a computing device architecture 800 for a computing device that is capable of executing various components described herein. The computing device architecture 800 is applicable to computing devices that facilitate computing due, in part, to form factor, wireless connectivity, and/or battery-powered operation. In some configurations, the computing devices include, but are not limited to, head-mounted display devices, smartphone devices, tablet devices, slate devices, video game devices, and the like.

The computing device architecture 800 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812.

The processor 802 may include a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein. For example, the SoC may include the processor 802, a GPU, one or more of the network connectivity components 806, and/or one or more of the sensor components 808. In some configurations, the processor 802 is fabricated, in part, utilizing a package-on-package ("PoP") integrated circuit packaging technique. The processor 802 may be a single core or multi-core processor.

The memory components 804 include a random access memory ("RAM") 814, a read-only memory ("ROM") 816, an integrated storage memory ("integrated storage") 818, and/or a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. The integrated storage 818 may be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, Compact-Flash card, memory stick, secure digital ("SD"), miniSD, microSD, universal integrated circuit card ("UICC") (e.g., a subscriber identity module ("SIM") or universal SIM ("USIM")), a proprietary format, or the like.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822.

The network 856 may be a WLAN operating in accordance with one or more Institute of Electrical and Electronic Engineers ("IEEE") 802.11 standards, such as IEEE 802.11a, 802.11b, 802.11g, 802.11n, and so forth (referred to herein collectively as Wi-Fi). In some configurations, the WLAN is implemented utilizing one or more wireless Wi-Fi access points. In some configurations, one or more of the wireless Wi-Fi access points are another computing device with connectivity to a WWAN that are functioning as a Wi-Fi hotspot. The WLAN component 824 is configured to connect to the network 856 via the Wi-Fi access points. Such connections may be secured via various encryption technologies including, but not limited, Wi-Fi Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices (e.g., IoT devices) via the WPAN.

The sensor components 808 include a magnetometer 828, a time-of-flight sensor 830 (e.g., the array of time-of-flight sensors described herein), a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations, the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen in response to receiving the proximity information so that the user's face does not inadvertently end a call or enable/disable other functionality within the telephone application program during the call.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. The GPS sensor 838 may obtain location information generated via Wi-Fi, WIMAX, and/or cellular triangulation techniques utilizing one or more of the network connectivity components 806 to aid the GPS sensor 838 in obtaining a location fix.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interfaces described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

The disclosure presented herein also encompasses the subject matter set forth in the following clauses.

Example Clause A, an imaging system comprising: a light emitting component configured to emit light to illuminate a scene; a light detecting component that includes: an array of time-of-flight pixels, wherein each time-of-flight pixel is configured to detect reflected light based on the emitted light and determine (i) phase shift data based on a phase shift between the emitted light and the reflected light and (ii) intensity data based on an amplitude of the reflected light; and a plurality of micro-lenses, wherein each micro-lens is shared by at least two time-of-flight pixels in the array; and a controller configured to: generate a first depth image of the scene using the phase shift data determined for each time-of-flight pixel in the array; determine disparity data using the intensity data of each of the at least two time-of-flight pixels shared by an individual micro-lens; generate a second depth image of the scene using the disparity data determined for each micro-lens of the plurality of micro-lens; and use at least one of the first depth image or the second depth image to determine a distance between an object in the scene and the imaging system.

Example Clause B, the imaging system of Clause A, wherein using the at least one of the first depth image or the second depth image to determine the distance between the object in the scene and the imaging system comprises: combining the first depth image with the second depth image by averaging depth values for a pixel to generate a representative depth image; and using the representative depth image to determine the distance between the object in the scene and the imaging system.

Example Clause C, the imaging system of Clause A, wherein using the at least one of the first depth image or the second depth image to determine the distance between the object in the scene and the imaging system comprises: comparing a first depth quality of the first depth image with a second depth quality of the second depth image; determining that one of the first depth quality or the second depth quality is better than the other of the first depth quality or the second depth quality; and selecting one of the first depth image or the second depth image to determine the distance between the object in the scene and the imaging system based at least in part on the determining that the one of the first depth quality or the second depth quality is better than the other of the first depth quality or the second depth quality.

Example Clause D, the imaging system of Clause C, wherein the first depth quality of the first depth image and the second depth quality of the second depth image are based on a segmentation analysis of uniformity and edge sharpness.

Example Clause E, the imaging system of any one of Example Clauses A through D, wherein the distance is used to focus a camera lens on the object in the scene.

Example Clause F, the imaging system of any one of Example Clauses A through D, wherein the distance is used to select a pre-configured mode useable to capture a photograph of the object in the scene.

Example Clause G, the imaging system of any one of Example Clauses A through F, configured as an integrated circuit that is part of a device.

Example Clause H, the imaging system of Clause G, wherein the device uses the distance to display virtual content in association with the object in the scene.

Example Clause I, a method comprising: emitting light to illuminate a scene; detecting, by an array of time-of-flight pixels, reflected light based on the emitted light, wherein the array of time-of-flight pixels includes a plurality of micro-lenses and each micro-lens is shared by at least two time-of-flight pixels; determining, by an individual time-of-flight pixel, in the array (i) phase shift data based on a phase shift between the emitted light and the reflected light and (ii) intensity data based on an amplitude of the reflected light; generating a first depth image of the scene using the phase shift data determined for each time-of-flight pixel in the array; determining disparity data using the intensity data of each of the at least two time-of-flight pixels shared by an individual micro-lens; generating a second depth image of the scene using the disparity data determined for each micro-lens of the plurality of micro-lens; and using at least one of the first depth image or the second depth image to determine a distance between an object in the scene and an imaging system that includes the array of time-of-flight pixels.

Example Clause J, the method of Example Clause I, wherein using the at least one of the first depth image or the second depth image to determine the distance between the object in the scene and the imaging system comprises: combining the first depth image with the second depth image by averaging depth values for a pixel to generate a representative depth image; and using the representative depth image to determine the distance between the object in the scene and the imaging system.

Example Clause K, the method of Example Clause I, wherein using the at least one of the first depth image or the second depth image to determine the distance between the object in the scene and the imaging system comprises: comparing a first depth quality of the first depth image with a second depth quality of the second depth image; determining that one of the first depth quality or the second depth quality is better than the other of the first depth quality or the second depth quality; and selecting one of the first depth image or the second depth image to determine the distance between the object in the scene and the imaging system based at least in part on the determining that the one of the first depth quality or the second depth quality is better than the other of the first depth quality or the second depth quality.

Example Clause L, the method of Example Clause K, wherein the first depth quality of the first depth image and the second depth quality of the second depth image are based on a segmentation analysis of uniformity and edge sharpness.

Example Clause M, the method of any one of Example Clauses I through L, wherein the distance is used to focus a camera lens on the object in the scene.

Example Clause N, the method of any one of Example Clauses I through L, wherein the distance is used to select a pre-configured mode useable to capture a photograph of the object in the scene.

Example Clause O, the method of any one of Example Clauses I through N, wherein the imaging system is configured as an integrated circuit that is part of a device that includes a camera.

Example Clause P, the method of Example Clause O, wherein the device uses the distance to display virtual content in association with the object in the scene.

Example Clause Q, an imaging system comprising: a light emitting component configured to emit light to illuminate a scene; a light detecting component that includes: an array of time-of-flight pixels, wherein each time-of-flight pixel is configured to detect reflected light based on the emitted light and determine (i) phase shift data based on a phase shift between the emitted light and the reflected light and (ii) intensity data based on an amplitude of the reflected light; and a plurality of micro-lenses, wherein each micro-lens is shared by at least two time-of-flight pixels in the array; and a controller configured to: determine disparity data using the intensity data of each of the at least two time-of-flight pixels shared by an individual micro-lens; and determine a distance between an object in the scene based in part on at least one of the phase shift data determined for each time-of-flight pixel in the array or the disparity data determined for each micro-lens of the plurality of micro-lens.

Example Clause R, the imaging system of Example Clause Q, wherein the distance is used to focus a camera lens on the object in the scene.

Example Clause S, the imaging system of Example Clause Q, wherein the distance is used to select a pre-configured mode useable to capture a photograph of the object in the scene.

Example Clause T, the imaging system of Example Clause Q, configured as an integrated circuit that is part of a device, wherein the device uses the distance to display virtual content in association with the object in the scene.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different depth images, two different ToF pixels, etc.).

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z,"

unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. An imaging system configured to use time-of-flight imaging and stereo imaging, the imaging system comprising:
a light emitting component configured to emit first light to illuminate a scene;
a light detecting component that includes:
an array of time-of-flight pixels, wherein:
each time-of-flight pixel is configured to detect second light that is reflected from the first light and determine (i) phase shift data based on a phase shift between the first light and the second light and (ii) intensity data based on an amplitude of the second light; and
each time-of-flight pixel includes a lone photo-sensing diode and at least one of (i) two transfer gates or (ii) two photo gates; and
a plurality of micro-lenses, wherein each micro-lens is shared by at least two time-of-flight pixels in the array; and
a controller configured to:
determine disparity data using the intensity data of each of the at least two time-of-flight pixels shared by an individual micro-lens; and
determine a distance between an object in the scene based in part on at least one of the phase shift data determined for each time-of-flight pixel in the array or the disparity data determined in association with the individual micro-lens of the plurality of micro-lenses.

2. The imaging system of claim 1, wherein the distance is used to focus a camera lens on the object in the scene.

3. The imaging system of claim 1, wherein the distance is used to select a pre-configured mode useable to capture a photograph of the object in the scene.

4. The imaging system of claim 1, configured as an integrated circuit that is part of a device, wherein the device uses the distance to display virtual content in association with the object in the scene.

5. The imaging system of claim 1, wherein the distance is used to improve motion recognition for an application executing on a connected computing system.

6. The imaging system of claim 1, wherein the distance is determined using the phase shift data determined for each time-of-flight pixel in the array when the object is located within a particular distance of the imaging system.

7. The imaging system of claim 1, wherein the distance is determined using the disparity data determined in association with the individual micro-lens of the plurality of micro-lenses when the object is located outside a particular distance of the imaging system.

8. A method for using time-of-flight imaging and stereo imaging, the method comprising:
emitting first light to illuminate a scene;
detecting, by an array of time-of-flight pixels, second light that is reflected from the first light, wherein:
each time-of-flight pixel includes a lone photo-sensing diode and at least one of (i) two transfer gates or (ii) two photo gates; and
the array of time-of-flight pixels includes a plurality of micro-lenses and each micro-lens is shared by at least two time-of-flight pixels;
determining, by an individual time-of-flight pixel in the array, (i) phase shift data based on a phase shift between the first light and the second light and (ii) intensity data based on an amplitude of the second light;
determining disparity data using the intensity data of each of the at least two time-of-flight pixels shared by an individual micro-lens; and
determining a distance between an object in the scene based in part on at least one of the phase shift data determined for each time-of-flight pixel in the array or the disparity data determined in association with the individual micro-lens of the plurality of micro-lenses.

9. The method of claim 8, wherein the distance is used to focus a camera lens on the object in the scene.

10. The method of claim 8, wherein the distance is used to select a pre-configured mode useable to capture a photograph of the object in the scene.

11. The method of claim 8, wherein the distance is used to display virtual content in association with the object in the scene.

12. The method of claim 8, wherein the distance is used to improve motion recognition for an application executing on a connected computing system.

13. The method of claim 8, wherein the distance is determined using the phase shift data determined for each time-of-flight pixel in the array when the object is located within a particular distance of the imaging system.

14. The method of claim 8, wherein the distance is determined using the disparity data determined in association with the individual micro-lens of the plurality of micro-lenses when the object is located outside a particular distance of the imaging system.

15. One or more non-transitory computer storage media storing instructions that, when executed by an imaging system, cause the imaging system to perform operations comprising:
determining, by an individual time-of-flight pixel in an array of time-of-flight pixels, (i) phase shift data based on a phase shift between first light emitted by the imaging system to illuminate a scene and second light that is detected based on a reflection of the first light and (ii) intensity data based on an amplitude of the second light;
determining disparity data using the intensity data of each of at least two time-of-flight pixels shared by an individual micro-lens of a plurality of micro-lenses included in the array of time-of-flight pixels; and
determining a distance between an object in the scene based in part on at least one of the phase shift data determined for each time-of-flight pixel in the array or the disparity data determined in association with the individual micro-lens of the plurality of micro-lenses.

16. The one or more non-transitory computer storage media of claim 15, wherein the distance is used to focus a camera lens on the object in the scene.

17. The one or more non-transitory computer storage media of claim 15, wherein the distance is used to select a pre-configured mode useable to capture a photograph of the object in the scene.

18. The one or more non-transitory computer storage media of claim 15, wherein the distance is used to display virtual content in association with the object in the scene.

19. The one or more non-transitory computer storage media of claim 15, wherein the distance is determined using the phase shift data determined for each time-of-flight pixel in the array when the object is located within a particular distance of the imaging system.

20. The one or more non-transitory computer storage media of claim 15, wherein the distance is determined using the disparity data deter in association with the individual micro-lens of the plurality of micro-lenses when the object is located outside a particular distance of the imaging system.

* * * * *